J. O. GILFILLAN.
VEHICLE SPRING.
APPLICATION FILED JAN. 2, 1915.
1,153,058.
Patented Sept. 7, 1915.
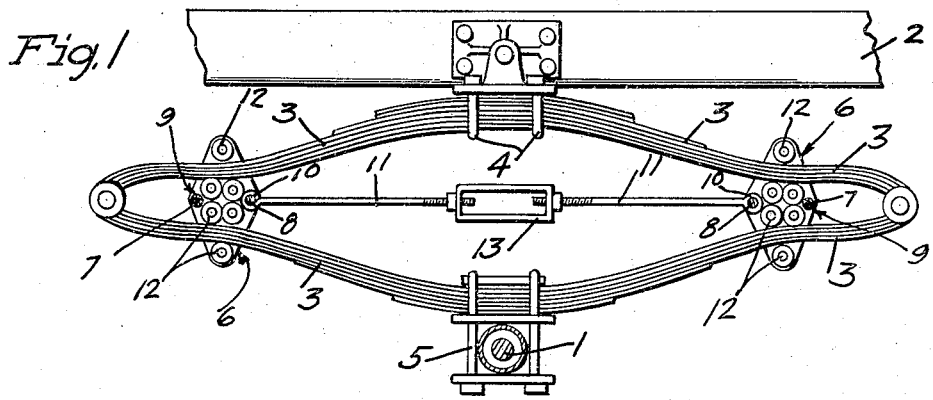
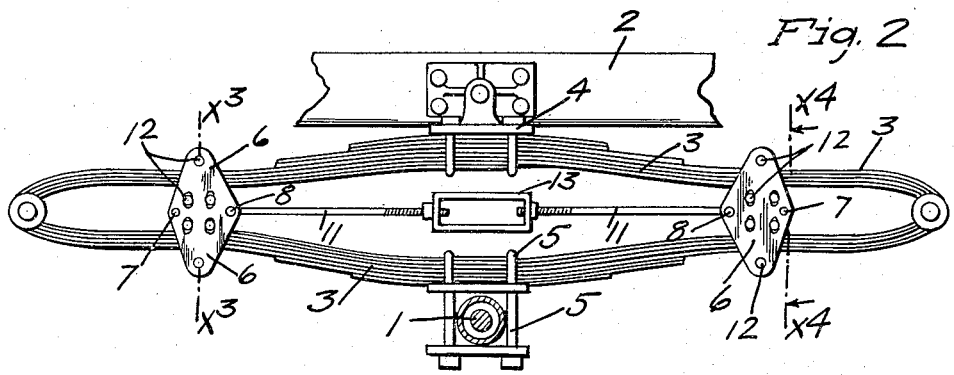
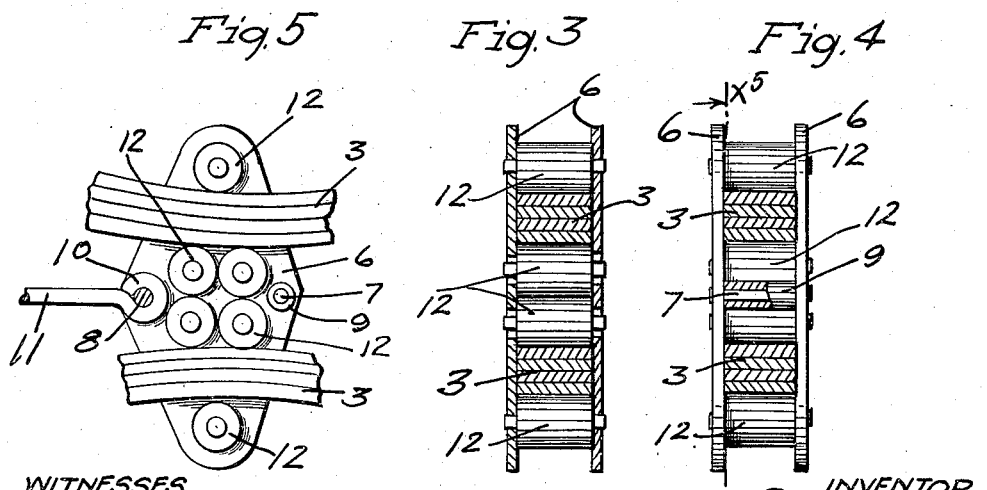
WITNESSES
E. C. Skinkle
H. D. Kilgore
INVENTOR
James O. Gilfillan
BY HIS ATTORNEYS
Williamson Merchant

UNITED STATES PATENT OFFICE.

JAMES O. GILFILLAN, OF NAPOLEON, NORTH DAKOTA.

VEHICLE-SPRING.

1,153,058. Specification of Letters Patent. Patented Sept. 7, 1915.

Application filed January 2, 1915. Serial No. 25.

*To all whom it may concern:*

Be it known that I, JAMES O. GILFILLAN, a citizen of the United States of America, residing at Napoleon, in the county of Logan and State of North Dakota, have invented certain new and useful Improvements in Vehicle-Springs; and I do hereby declare the following to be a full, clear, and exact description of the invention, such as will enable others skilled in the art to which it appertains to make and use the same.

My present invention relates to vehicle springs; and, is in the nature of an improvement or modification of my U. S. Letters Patent, Number 1,117,369, issued to me November the 17th, 1914, and entitled "Vehicle spring".

To the above end, the invention consists of the novel devices, and combinations of devices hereinafter described and defined in the claims.

In the accompanying drawings, which illustrate the invention, like characters indicate like parts, throughout the several views.

Referring to the drawings, Figure 1, is a side elevation, showing the invention applied to a vehicle in working position, some parts being broken away and some parts being shown in section; Fig. 2, is a view corresponding to Fig. 1, with the exception that the spring of the vehicle is shown compressed; Fig. 3, is a detail view partly in elevation, and partly in transverse vertical section, taken on the line $X^3$ $X^3$ of Fig. 2, on an enlarged scale; Fig. 4, is a detail view partly in elevation, and partly in transverse vertical section, taken on the line $X^4$ $X^4$ of Fig. 2, on an enlarged scale; and Fig. 5, is a view partly in elevation and partly in section, taken on the line $X^5$ $X^5$ of Fig. 4.

The numeral 1 indicates the rear axle of a vehicle running gear, and the numeral 2 indicates the vehicle body. This body 2, is supported on the axle 1 by an elliptical spring 3, made up of a plurality of leaves. The leaves of the upper section of the spring 3, are clamped together and secured to the body 2, by clips 4, and the leaves of the lower section of said spring are clamped together and secured to the axle 1 by clips 5. The parts thus far described, may be of the standard or of any desired construction.

As set forth in my prior patent above identified, and as is well known vehicle springs act more efficiently when carrying the full load for which they are designed, than when carrying only a part of the load. This is particularly true in the spring of light, hard riding automobiles. To overcome this difficulty, I provide means for throwing more or less of the springs out of action, depending on the load carried. My present invention, for accomplishing this result, comprises a pair of spacing heads and means for connecting and setting said heads in different pre-determined positions. These spacing heads are identical one with the other, except that they are turned as entireties in reverse directions, and the description of the one will suffice for the other. Each spacing head comprises a pair of laterally spaced plates 6 connected by a pair of relatively long horizontally spaced rivets 7 and 8. Telescoped on to the rivets 7 and 8 are sleeves 9 and 10 respectively, and with the latter is integrally formed a bolt or rod 11 having its free end screw-threaded. Obviously these sleeves 9 and 10 hold the plates 6 properly spaced, as well as permitting free vertical swinging movement of the rod 11.

Journaled to and between the plates 6 is a plurality of anti-friction roller guides 12, arranged in vertically spaced sets. These sets of rollers 12, together with the side plates 6, embrace the respective sections of the spring 3 and thereby hold the upper and lower sections of said spring against separation or approach the one in respect to the other. These rollers 12 however, permit free longitudinal sliding movement of the embraced spring sections during the compression or expression of said spring. As shown, there are three of the roller guides 12 in each set. In the set embracing the upper section of the spring 3, there is a single roller guide, vertically spaced above two horizontally spaced roller guides 12, while in the set embracing the lower section of said spring, the roller guides 12 are arranged in reverse order.

The rods 11 project horizontally toward each other, and are connected by a turn buckle 13. The screw threads connecting the turn-buckle 13, with the rods 11, are rights and lefts, so that under the rotary movement of said turn-buckle, the spacing heads will be either drawn toward or from each other. By setting the spacing heads in different adjustments with respect to each other more or less of the operative length of the spring 3 may be normally cut out.

Under an increased load in the vehicle, the compression of the spring 3 will move the outer end portions thereof, outward between the respective sets of roller guides 12 thereby shortening the operative length of said spring and decreasing its elasticity in order to overcome the additional load. When the increased load is removed from the vehicle the separation of the spring sections will cause said sections to move longitudinally between the roller guides 12 to permit said spring to assume its normal operative length. The rods 11 and turn-buckle 13 hold the spacing heads anchored and in most cases, a more positive anchor is not thought necessary.

As shown in Figs. 2 and 3, the seats for the trunnions of the central groups of rollers 12, are vertically elongated, so that the only wear between said seats and trunnions, is on the vertical edges of said seats. It will also be noted that the upper and lower rollers of each group run directly one upon the other.

It is of course evident that the extreme upper and lower roller guides 12, take the rebound or recoil of the spring 3.

The above described invention can readily be incorporated, in my prior patent, herein identified.

What I claim is:

1. The combination with a vehicle spring, of a relatively fixed spacing head having coöperating upper and lower roller guides embracing said spring, permitting longitudinal movement of said spring there between, for throwing more or less of said spring out of action, under the movement of the body of the vehicle with respect to the running gear thereof, and means for adjusting said spacing head longitudinally of said spring.

2. The combination with a vehicle spring, of a pair of relatively fixed spacing heads having coöperating upper and lower roller guides embracing the outer end portions of said spring, permitting longitudinal movement of said spring there between, for throwing more or less of said spring out of action, under the movement of the body of the vehicle with respect to the running gear thereof, and means for adjusting said spacing heads toward and from each other.

3. An elliptical vehicle spring having its upper and lower sections anchored, one to the vehicle body and the other to the running gear thereof, and a pair of relatively fixed spacing heads embracing the outer end portions of the spring and having transverse portions extending between the sections thereof, said spacing heads permitting longitudinal movement of the spring therethrough, for throwing more or less of said spring out of action, under the movement of the body of said vehicle with respect to said running gear, but holding the sections of the spring against separation and approach in respect to each other.

4. An elliptical vehicle spring having its upper and lower sections anchored, one to the vehicle body and the other to the running gear thereof, a pair of relatively fixed spacing heads embracing the outer end portions of said spring sections, permitting longitudinal movement of said spring therethrough, for throwing more or less of said spring out of action, under the movement of the body of said vehicle with respect to said running gear, said spacing heads holding the embraced portions of said spring sections against separation and approach in respect to each other, and means for adjusting said spacing heads, toward and from each other.

5. An elliptical vehicle spring having its upper and lower sections anchored, one to the vehicle body and the other to the running gear thereof, and a pair of relatively fixed spacing heads having coöperating upper and lower roller guides through which the outer end portions of the upper section of said spring are free to move longitudinally and having coöperating upper and lower roller guides through which the outer end portions of the lower section of said spring are free to move longitudinally, for throwing more or less of said spring sections out of action, under the movement of the body of said vehicle with respect to said running gear.

6. An elliptical vehicle spring having its upper and lower sections anchored, one to the vehicle body and the other to the running gear thereof, a pair of relatively fixed spacing heads having coöperating upper and lower roller guides, through which the outer end portions of the upper section of said spring are free to move longitudinally and having coöperating upper and lower roller guides through which the outer end portions of the lower section of said spring are free to move longitudinally for throwing more or less of said spring sections out of action, under the movement of the body of said vehicle with respect to said running gear, and means for adjusting said spacing heads toward and from each other.

7. An elliptical vehicle spring having its upper and lower sections anchored, one to the vehicle body and the other to the running gear thereof, a pair of relatively fixed spacing heads having coöperating upper and lower roller guides through which the outer end portions of the upper section of said spring are free to move longitudinally and having coöperating upper and lower roller guides through which the outer end portions of the lower section of said spring are free to move longitudinally for throwing more or less of said spring sections out of action, under the movement of the body of said vehicle with respect to said running gear, and links and a turnbuckle for adjustably connecting said spacing heads.

8. An elliptical vehicle spring having its upper and lower sections anchored, one to the vehicle body and the other to the running gear thereof, a pair of spacing heads mounted on the spring, with freedom for longitudinal movement thereon for throwing more or less of said spring out of action under the movement of the body of the vehicle, with respect to the running gear thereof, and an adjustable connection between the spacing heads for setting the same different distances apart.

9. An elliptical vehicle spring having its upper and lower sections anchored, one to the vehicle body and the other to the running gear thereof, and a pair of relatively fixed spacing heads, each of said spacing heads having vertically spaced roller guides between which the respective end of said spring projects and vertically spaced central roller guides extending between the sections of said spring, said central roller guides arranged to run one directly upon the other.

In testimony whereof I affix my signature in presence of two witnesses.

JAMES O. GILFILLAN.

Witnesses:
O. F. BRYANT,
TILLIE SHORTELL.

Copies of this patent may be obtained for five cents each, by addressing the "Commissioner of Patents, Washington, D. C."